(12) United States Patent
Miura

(10) Patent No.: US 10,066,091 B2
(45) Date of Patent: Sep. 4, 2018

(54) RUBBER COMPOSITION FOR TIRE AND PNEUMATIC TIRE

(71) Applicant: TOYO TIRE & RUBBER CO., LTD., Osaka-shi, Osaka (JP)

(72) Inventor: Souichiro Miura, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 1 day.

(21) Appl. No.: 15/251,496

(22) Filed: Aug. 30, 2016

(65) Prior Publication Data

US 2017/0066910 A1    Mar. 9, 2017

(30) Foreign Application Priority Data

Sep. 9, 2015 (JP) ................................. 2015-177794

(51) Int. Cl.
| | | |
|---|---|---|
| *C08L 9/06* | (2006.01) | |
| *B60C 1/00* | (2006.01) | |
| *C08L 7/00* | (2006.01) | |

(52) U.S. Cl.
CPC .............. *C08L 9/06* (2013.01); *B60C 1/0016* (2013.01); *C08L 7/00* (2013.01); *Y02T 10/862* (2013.01)

(58) Field of Classification Search
CPC ............. B60C 1/0016; C08L 9/06; C08L 7/00
See application file for complete search history.

(56) References Cited

U.S. PATENT DOCUMENTS

| | | | | |
|---|---|---|---|---|
| 2,328,534 A | * | 8/1943 | Carson | C08L 7/00 36/DIG. 1 |
| 3,060,989 A | * | 10/1962 | Railsback | C08L 7/00 152/209.1 |
| 3,076,718 A | * | 2/1963 | Gearhart | C09D 101/18 106/162.8 |
| 3,167,522 A | * | 1/1965 | Shulman | B29C 73/163 252/72 |
| 5,800,848 A | * | 9/1998 | Yatka | A23G 4/06 426/3 |
| 6,077,903 A | | 6/2000 | Ngoc | |
| 2009/0326109 A1 | | 12/2009 | Kameda et al. | |
| 2012/0302664 A1 | * | 11/2012 | Kamada | B60C 1/0016 523/156 |

FOREIGN PATENT DOCUMENTS

| | | |
|---|---|---|
| JP | 2004-204176 A | 7/2004 |
| JP | 2010-31261 A | 2/2010 |
| WO | WO-2014097220 A1 * 6/2014 | .............. C08L 15/02 |

OTHER PUBLICATIONS

Office Action dated Jul. 4, 2018, issued in counterpart Chinese Application No. 201610815952.8, with English machine translation. (10 pages).

* cited by examiner

*Primary Examiner* — Nicholas E Hill
(74) *Attorney, Agent, or Firm* — Westerman, Hattori, Daniels & Adrian, LLP

(57) ABSTRACT

A rubber composition for a tire that can reduce rolling resistance is provided. The rubber composition for a tire contains a diene rubber, at least one reinforcing filler selected from the group consisting of silica and carbon black, and at least one sucrose derivative selected from the group consisting of sucrose benzoate and sucrose acetate, wherein the amount of the sucrose derivative is from 1 to 25 parts by mass per 100 parts by mass of the diene rubber. A pneumatic tire having a rubber part comprising the rubber composition is provided.

9 Claims, No Drawings

RUBBER COMPOSITION FOR TIRE AND PNEUMATIC TIRE

CROSS-REFERENCE TO RELATED APPLICATIONS

This application is based upon and claims the benefit of priority from the prior Japanese Patent Application No. 2015-177794, filed on Sep. 9, 2015; the entire contents of which are incorporated herein by reference.

BACKGROUND

1. Technical Field

The present invention relates to a rubber composition for a tire and a pneumatic tire using the rubber composition.

2. Related Art

Conventionally, it is proposed in a rubber composition for a tire to add various additives in order to reduce rolling resistance of a tire and improve low fuel consumption. For example, JP-A-2004-204176 proposes to add cyclodextrin or sucrose, and a sulfur-containing silane coupling agent to a rubber composition containing a diene rubber mainly comprising styrene-butadiene rubber for the purpose of the improvement of wet performance and the reduction of rolling resistance.

Thus, it has been conventionally known to add a saccharide to a rubber composition, but it has not been known to add sucrose benzoate or sucrose acetate to a rubber composition.

JP-A-2010-031261 proposes a rubber composition for a tire comprising specific diene rubber having added thereto a tea extract together with specific carbon black and silica in order to improve abrasion resistance without deterioration of rolling resistance performance. This patent document discloses sucrose fatty acid ester as a surfactant for treating the extract, but does not disclose sucrose benzoate or sucrose acetate.

JP-A-11-343302 discloses a leather-like composition for automotive interior in which a sucrose derivative such as sucrose benzoate is used as a plasticizer added together with polyvinyl chloride and a rubbery polymer. However, this patent document does not relate to a rubber composition for a tire. Furthermore, in this patent document, an acrylate elastomer is used as the rubbery polymer, and it is not disclosed to use a diene rubber. Therefore, this patent document does not disclose to combine a sucrose derivative with a diene rubber and a reinforcing filler.

SUMMARY

An object of the present embodiment is to provide a rubber composition for a tire that can reduce rolling resistance.

The rubber composition according to the present embodiment comprises a diene rubber, at least one reinforcing filler selected from the group consisting of silica and carbon black, and at least one sucrose derivative selected from the group consisting of sucrose benzoate and sucrose acetate, wherein the amount of the sucrose derivative is from 1 to 25 parts by mass per 100 parts by mass of the diene rubber.

The pneumatic tire according to the present embodiment has a rubber part comprising the rubber composition.

According to the present embodiment, the addition of sucrose benzoate and/or sucrose acetate together with silica and/or carbon black to a diene rubber can reduce rolling resistance due to the decrease of heat generation. Furthermore, the improvement effect of hardness is obtained.

DETAILED DESCRIPTION

Elements for carrying out the present embodiments are described in detail below.

The rubber composition according to the present embodiment comprises (A) a diene rubber, (B) a reinforcing filler and (C) a sucrose derivative.

(A) Diene Rubber

The diene rubber as a rubber component is not particularly limited. Examples of the diene rubber that can be used include natural rubber (NR), isoprene rubber (IR), butadiene rubber (BR), styrene-butadiene rubber (SBR), styrene-isoprene rubber, butadiene-isoprene rubber, styrene-butadiene-isoprene rubber and nitrile rubber (NBR). Those diene rubbers can be used alone or as mixtures of two or more kinds. More preferred diene rubber is at least one selected from the group consisting of natural rubber, butadiene rubber and styrene-butadiene rubber.

As one embodiment, the diene rubber is styrene-butadiene rubber alone or a blend of styrene-butadiene rubber and other diene rubber (for example, butadiene rubber and/or natural rubber). In the case of a blend, it is preferred that the diene rubber (100 parts by mass) contains SBR in an amount of 50 parts by mass or more. For example, the diene rubber (100 parts by mass) comprises from 50 to 90 parts by mass of SBR and from 10 to 50 parts by mass of BR and/or NR.

As one embodiment, the diene rubber is natural rubber alone or a blend of natural rubber and other diene rubber (for example, butadiene rubber). In the case of a blend, it is preferred that the diene rubber (100 parts by mass) contains NR in an amount of 50 parts by mass or more. For example, the diene rubber (100 parts by mass) comprises from 50 to 90 parts by mass of NR and from 10 to 50 parts by mass of BR.

A modified diene rubber having at least one functional group selected from the group consisting of a hydroxyl group, an amino group, a carboxyl group, an alkoxyl group, an alkoxysilyl group and an epoxy group introduced into a molecular terminal or a molecular chain of the above-described diene rubber, thereby modifying the diene rubber with the functional group, may be used as the diene rubber. The amino group used herein is not only a primary amino group, but may be a secondary or tertiary amino group. The carboxyl group includes not only —COOH, but an acid anhydride group. Examples of the alkoxyl group include a methoxy group or ethoxy group represented by —OR (wherein R represents, for example, an alkyl group having from 1 to 4 carbon atoms). Examples of the alkoxysilyl group include a trialkoxysilyl group and an alkyl dialkoxysilyl group, in which at least one of three hydrogen atoms in the silyl group is substituted with an alkoxyl group. Those functional groups have an interaction (reactivity or affinity) with the surface of the reinforcing filler, such as a silanol group on silica surface, and contributes to the improvement of dispersibility of the reinforcing filler. The modified diene rubber is preferably a modified SBR and/or a modified BR. In one embodiment, the diene rubber is a modified diene rubber alone or is a blend of a modified diene rubber and an unmodified diene rubber. In one embodiment, the diene rubber (100 parts by mass) contains 30 parts by mass or more of a modified SBR, and, for example, comprises from 50 to 90 parts by mass of a modified SBR and from 50 to 10 parts by mass of an unmodified diene rubber (for example, BR and/or NR).

(B) Reinforcing Filler

Examples of the reinforcing filler include silica, carbon black, and a mixture of silica and carbon black.

The silica is not particularly limited. Wet silica such as wet precipitated silica or wet gelled silica is preferably used. Colloidal characteristics of the silica are not particularly limited, but the silica in which nitrogen adsorption specific surface area (BET) by BET method is from 90 to 250 $m^2/g$ is preferably used. The BET is more preferably from 150 to 230 $m^2/g$. The BET of silica is measured according to BET method defined in ISO 5794.

The carbon black is not particularly limited, and can use the conventional various kinds of carbon black. For example, in the case of using in a tire tread rubber, carbon black of SAF grade (N100 Series), ISAF grade (N200 Series), HAF grade (N300 Series) and FEF grade (N500 Series) (those are ASTM grade) is preferably used. The carbon black of each grade can be used in one kind alone or as mixtures of two or more kinds thereof.

The amount of the reinforcing filler added may be from 10 to 150 parts by mass, may be from 20 to 120 parts by mass, may be from 30 to 100 parts by mass, and may be from 30 to 80 parts by mass, per 100 parts by mass of the diene rubber. When silica is added as the reinforcing filler, the amount thereof added may be from 10 to 120 parts by mass, may be from 20 to 100 parts by mass, and may be from 20 to 80 parts by mass, per 100 parts by mass of the diene rubber. When carbon black is added as the reinforcing filler, the amount thereof added may be from 5 to 120 parts by mass, may be from 10 to 100 parts by mass, and may be from 20 to 80 parts by mass, per 100 parts by mass of the diene rubber. In the addition of silica, when carbon black is used mainly for the purpose of coloration, the amount of the carbon black added may be from 5 to 10 parts by mass per 100 parts by mass of the diene rubber.

(C) Sucrose Derivative

Examples of the sucrose derivative include sucrose benzoate, sucrose acetate, and a mixture of sucrose benzoate and sucrose acetate. According to the present embodiment, by adding the sucrose derivative, rolling resistance can be reduced by the decrease of heat generation, and additionally, the effect of increasing hardness is obtained. The reason for this is assumed as follows, but this assumption does not intend to limit the present invention. That is, it is considered that a reaction with the surface of silica or carbon black as the reinforcing filler is activated by a benzoic acid ester group or an acetic acid ester group, and a hydroxyl group contained in a sucrose derivative. It is considered that dispersibility of the reinforcing filler is improved by this action, thereby decreasing hysteresis loss, and rolling resistance is reduced. Furthermore, it is considered that by bonding the sucrose derivative to the reinforcing filler, crystallinity of the sucrose derivative improves reinforcing property of the reinforcing filler, and thereby hardness is improved.

Sucrose benzoate is obtained by ester-bonding benzoic acid to a hydroxyl group of sucrose. The sucrose benzoate is generally produced by esterification reaction between sucrose and benzoyl chloride. Since sucrose has 8 hydroxyl groups in one molecule, an average esterification degree of sucrose benzoate is more than 0 and 8 or less. The average esterification degree of sucrose benzoate is not particularly limited, may be from 1 to 8, and may be from 5 to 8. The sucrose benzoate may use compounds prepared by the conventional synthesis methods, and may use the commercially available products. As one example, MONOPET SB manufactured by DKS Co., Ltd. can be used.

The average esterification degree used herein is an average value of esterification degree (substitution degree by benzoic acid) by mass ratio of each ester constituting sucrose benzoate. For example, in the case of 100 mass % monoester, the average esterification degree is 1, and in the case of 50 mass % monoester and 50 mass % diester, the average esterification degree is 1.5. The same can apply to the case of sucrose acetate.

Sucrose acetate is obtained by ester-bonding acetic acid to a hydroxyl group of sucrose. Since sucrose has 8 hydroxyl groups in one molecule, an average esterification degree of sucrose acetate is more than 0 and 8 or less. The average esterification degree of sucrose acetate is not particularly limited, may be from 1 to 8, and may be from 5 to 8. The sucrose acetate may use compounds prepared by the conventional synthesis methods, and may use the commercially available products. As one example, MONOPET SOA manufactured by DKS Co., Ltd. can be used.

The amount of the sucrose derivative added is from 1 to 25 parts by mass, preferably from 1 to 15 parts by mass, may be from 3 to 15 parts by mass, and may be from 3 to 10 parts by mass, per 100 parts by mass of the diene rubber. When the amount of the sucrose derivative added is 1 part by mass or more, the effect of reducing rolling resistance and the effect of increasing hardness can be enhanced. When the amount of the sucrose derivative added is 25 parts by mass or less, the effect of reducing rolling resistance can be enhanced.

(D) Other Components

The rubber composition according to the present embodiment can contain various additives that are generally used in a rubber composition, such as a silane coupling agent, a processing oil, stearic acid, zinc flower, an age resister, a wax, a vulcanizing agent and a vulcanization accelerator, in addition to the above components.

Examples of the silane coupling agent include sulfide silane and mercaptosilane. The silane coupling agent can improve dispersibility of silica. The amount of the silane coupling agent added is not particularly limited, but is preferably from 2 to 20 mass % based on the amount of silica added.

Examples of the vulcanizing agent include sulfurs such as powdered sulfur, precipitated sulfur, colloidal sulfur, insoluble sulfur and highly dispersible sulfur. The amount of the vulcanizing agent added is not particularly limited, but is preferably from 0.1 to 10 parts by mass, and more preferably from 0.5 to 5 parts by mass, per 100 parts by mass of the diene rubber.

The rubber composition according to the present embodiment can be prepared by kneading the necessary components according to the conventional method using a mixing machine generally used, such as a Banbury mixer, a kneader or rolls. Specifically, other additives excluding a vulcanizing agent and a vulcanization accelerator are added to a diene rubber together with a reinforcing filler and a sucrose additive, followed by mixing, in a first mixing step. A vulcanizing agent and a vulcanization accelerator are then added to the mixture thus obtained, followed by mixing, in a final mixing step. Thus, a rubber composition can be obtained.

The rubber composition according to the present embodiment can be used as a rubber composition for a tire. Examples of the tire include pneumatic tires having various sizes for various uses, such as tires for passenger cars and tires for heavy load of trucks and buses. The pneumatic tire according to one embodiment has a rubber part comprising the rubber composition. Examples of the site of a tire to which the rubber composition is applied include a tread rubber and a side wall rubber. The rubber composition is preferably used in a tread rubber. The tread rubber of a pneumatic tire includes a tread rubber comprising a two-layered structure of a cap rubber and a base rubber, and a single layer structure in which those are integrated. The rubber composition is preferably used in a rubber constituting a ground contact surface. That is, it is preferred that when the tread rubber has a single layer structure, the tread rubber comprises the rubber composition, and when the tread rubber has a two-layered structure, the cap rubber comprises the rubber composition.

The manufacturing method of a pneumatic tire is not particularly limited. For example, the rubber composition is formed into a given shape by extrusion processing according to the conventional method, and the formed product obtained is combined with other parts, thereby manufacturing an unvulcanized tire (green tire). The green tire obtained is then vulcanization-molded at a temperature of, for example, from 140 to 180° C. Thus, a pneumatic tire can be manufactured.

EXAMPLES

Examples of the present embodiment are described below, but the present invention is not construed as being limited to those examples.

Raw Materials

Raw materials used in the following examples are as follows.

SBR: Terminal alkoxyl group and amino group-modified solution-polymerized SBR, "HPR350" manufactured by JSR Corporation

NR: RSS#3

BR: "BR150B" (Tg: −104° C.) manufactured by Ube Industries Ltd.

Silica: "NIPSIL AQ" (BET: 205 $m^2$/g, CTAB: 175 $m^2$/g, DBP: 150 $cm^3$/100 g) manufactured by Tosoh Silica Corporation Carbon black: "DIABLACK N341", HAF, manufactured by Mitsubishi Chemical Corporation Oil: "PROCESS NC140" manufactured by JX Nippon Oil & Sun Energy Corporation Zinc flower: "Zinc Flower #1" manufactured by Mitsui Mining & Smelting Co., Ltd.

Age resister: "NOCRAC 6C", N-(1,3-dimethylbutyl)-N'-phenyl-p-phenylenediamine, 6PPD, manufactured by Ouchi Shinko Chemical Industrial Co., Ltd.

Stearic acid: "LUNAC S-20" manufactured by Kao Corporation

Wax: "OZOACE 0355" manufactured by Nippon Seiro Co., Ltd.

Silane coupling agent: "Si75" manufactured by Evonik

Sucrose benzoate: "MONOPET SB" manufactured by DKS Co., Ltd.

Sucrose acetate: "MONOPET SOA", sucrose octaacetate, manufactured by DKS Co., Ltd.

Sucrose fatty acid ester: "DK ESTER F-160", long chain fatty acid ester of sucrose, manufactured by DKS Co., Ltd.

Sulfur: "POWDERED SULFUR" manufactured by Tsurumi Chemical Industry Co., Ltd.

Vulcanization accelerator: "SOXINOL CZ" manufactured by Sumitomo Chemical Co., Ltd.

Evaluation Method

Evaluation methods of the rubber compositions in the examples described hereinafter are as follows.

Rolling resistance: Loss factor tan δ was measured under the conditions of temperature: 60° C., frequency: 10 Hz, initial strain: 10% and dynamic strain: ±1% using a viscoelasticity tester manufactured by Toyo Seiki Seisaku-Sho, Ltd. according to JIS K6394. In the results of First Example, rolling resistance was indicated by an index as the value of Comparative Example 1 being 100. In the results of Second Example, rolling resistance was indicated by an index as the value of Comparative Example 11 being 100. In the results of Third Example, rolling resistance was indicated by an index as the value of Comparative Example 21 being 100. The value of tan δ at 60° C. is generally used as an index of low heat generation performance in the rubber composition for a tire. The value of tan δ is small as the index is small, and therefore, heat is difficult to be generated. As a result, rolling resistance as a tire is low, and this indicates excellent low fuel consumption.

Hardness: Hardness at 23° C. was measured using durometer type A according to JIS K6253. In the results of First Example, hardness was indicated by an index as the value of Comparative Example 1 being 100. In the results of Second Example, hardness was indicated by an index as the value of Comparative Example 11 being 100. In the results of Third Example, hardness was indicated by an index as the value of Comparative Example 21 being 100. Hardness is large as the index is large.

First Example

A Banbury mixer was used. Ingredients excluding sulfur and a vulcanization accelerator were added to a diene rubber according to the formulations (parts by mass) shown in Table 1 below, followed by kneading, in a first mixing step (discharge temperature: 160° C.). Sulfur and a vulcanization accelerator were added to the kneaded material obtained, followed by kneading, in a final mixing step (discharge temperature: 90° C.). Thus, a rubber composition was prepared. A test piece having a given shape was prepared by vulcanization at 160° C. for 30 minutes using the rubber composition obtained. Using the test piece, rolling resistance and hardness were evaluated.

The results obtained are shown in Table 1 below. Improvement effect in rolling resistance and hardness was not observed in Comparative Example 2 in which sucrose fatty acid ester had been added, as compared with Comparative Example 1 as, a control. On the other hand, in Examples 1 to 6 in which sucrose benzoate or sucrose acetate had been added, rolling resistance was reduced, and additionally, the improvement effect of hardness was observed.

TABLE 1

| | Com. Ex. 1 | Com. Ex. 2 | Com. Ex. 3 | Com. Ex. 4 | Ex. 1 | Ex. 2 | Ex 3 | Ex. 4 | Ex. 5 | Ex. 6 |
|---|---|---|---|---|---|---|---|---|---|---|
| Formulation (parts by mass) | | | | | | | | | | |
| SBR | 80 | 80 | 80 | 80 | 80 | 80 | 80 | 80 | 80 | 80 |
| BR | 20 | 20 | 20 | 20 | 20 | 20 | 20 | 20 | 20 | 20 |

TABLE 1-continued

|  | Com. Ex. 1 | Com. Ex. 2 | Com. Ex. 3 | Com. Ex. 4 | Ex. 1 | Ex. 2 | Ex. 3 | Ex. 4 | Ex. 5 | Ex. 6 |
|---|---|---|---|---|---|---|---|---|---|---|
| Silica | 50 | 50 | 50 | 50 | 50 | 50 | 50 | 50 | 50 | 50 |
| Carbon black | 10 | 10 | 10 | 10 | 10 | 10 | 10 | 10 | 10 | 10 |
| Oil | 20 | 20 | 20 | 20 | 20 | 20 | 20 | 20 | 20 | 20 |
| Zinc flower | 3 | 3 | 3 | 3 | 3 | 3 | 3 | 3 | 3 | 3 |
| Age resister | 2 | 2 | 2 | 2 | 2 | 2 | 2 | 2 | 2 | 2 |
| Stearic acid | 2 | 2 | 2 | 2 | 2 | 2 | 2 | 2 | 2 | 2 |
| Wax | 2 | 2 | 2 | 2 | 2 | 2 | 2 | 2 | 2 | 2 |
| Silane coupling Agent | 6 | 6 | 6 | 6 | 6 | 6 | 6 | 6 | 6 | 6 |
| Sucrose benzoate |  |  | 0.5 | 30 | 1 |  | 5 |  | 10 |  |
| Sucrose acetate |  |  |  |  |  | 1 |  | 5 |  | 10 |
| Sucrose fatty acid ester |  | 5 |  |  |  |  |  |  |  |  |
| Sulfur | 2 | 2 | 2 | 2 | 2 | 2 | 2 | 2 | 2 | 2 |
| Vulcanization accelerator | 2 | 2 | 2 | 2 | 2 | 2 | 2 | 2 | 2 | 2 |
| Evaluation (index) |  |  |  |  |  |  |  |  |  |  |
| Rolling resistance | 100 | 100 | 98 | 111 | 95 | 94 | 93 | 93 | 91 | 90 |
| Hardness | 100 | 101 | 102 | 111 | 106 | 106 | 108 | 108 | 109 | 109 |

Second Example

A Banbury mixer was used. The first mixing step and final mixing step were carried out according to the formulations (parts by mass) shown in Table 2 below in the same manner as in First Example. Thus, a rubber composition was prepared. A test piece having a given shape was prepared by vulcanization at 160° C. for 30 minutes using the rubber composition obtained. Using the test piece, rolling resistance and hardness were evaluated.

The results obtained are shown in Table 2 below. Second Example is the case of NR/BR. system and carbon black addition. In Examples 11 to 16 in which sucrose benzoate or sucrose acetate had been added, similar to First Example that is the case of SBR/BR system and silica addition, rolling resistance was reduced, and additionally, the improvement effect of hardness was observed, as compared with Comparative Example 11 as a control.

Third Example

A Banbury mixer was used. The first mixing step and final mixing step were carried out according to the formulations (parts by mass) shown in Table 3 below in the same manner as in First. Example. Thus, a rubber composition was prepared. A test piece having a given shape was prepared by vulcanization at 160° C. for 30 minutes using the rubber composition obtained. Using the test piece, rolling resistance and hardness were evaluated.

The results obtained are shown in Table 3 below. Third Example is the case that silica and carbon black had been added in the same amount. In Examples 21 and 22 in which sucrose benzoate or sucrose acetate had been added, similar to First Example that is the case of silica addition, rolling resistance was reduced, and additionally, the improvement effect of hardness was observed, as compared with Comparative Example 21 as a control.

TABLE 2

|  | Com. Ex. 11 | Com. Ex. 12 | Com Ex. 13 | Com. Ex. 14 | Ex. 11 | Ex. 12 | Ex. 13 | Ex. 14 | Ex. 15 | Ex. 16 |
|---|---|---|---|---|---|---|---|---|---|---|
| Formulation (parts by mass) |  |  |  |  |  |  |  |  |  |  |
| NR | 80 | 80 | 80 | 80 | 80 | 80 | 80 | 80 | 80 | 80 |
| BR | 20 | 20 | 20 | 20 | 20 | 20 | 20 | 20 | 20 | 20 |
| Carbon black | 60 | 60 | 60 | 60 | 60 | 60 | 60 | 60 | 60 | 60 |
| Oil | 20 | 20 | 20 | 20 | 20 | 20 | 20 | 20 | 20 | 20 |
| Zinc flower | 3 | 3 | 3 | 3 | 3 | 3 | 3 | 3 | 3 | 3 |
| Age resister | 2 | 2 | 2 | 2 | 2 | 2 | 2 | 2 | 2 | 2 |
| Stearic acid | 2 | 2 | 2 | 2 | 2 | 2 | 2 | 2 | 2 | 2 |
| Wax | 2 | 2 | 2 | 2 | 2 | 2 | 2 | 2 | 2 | 2 |
| Sucrose benzoate |  |  | 0.5 | 30 | 1 |  | 5 |  | 10 |  |
| Sucrose acetate |  |  |  |  |  | 1 |  | 5 |  | 10 |
| Sucrose fatty acid ester |  | 5 |  |  |  |  |  |  |  |  |
| Sulfur | 2 | 2 | 2 | 2 | 2 | 2 | 2 | 2 | 2 | 2 |
| Vulcanization accelerator | 2 | 2 | 2 | 2 | 2 | 2 | 2 | 2 | 2 | 2 |
| Evaluation (index) |  |  |  |  |  |  |  |  |  |  |
| Rolling resistance | 100 | 100 | 98 | 110 | 95 | 95 | 93 | 92 | 91 | 91 |
| Hardness | 100 | 101 | 102 | 110 | 108 | 106 | 110 | 109 | 111 | 110 |

TABLE 3

|  | Com. Ex. 21 | Ex. 21 | Ex. 22 |
| --- | --- | --- | --- |
| Formulation (parts by mass) | | | |
| SBR | 80 | 80 | 80 |
| BR | 20 | 20 | 20 |
| Silica | 30 | 30 | 30 |
| Carbon black | 30 | 30 | 30 |
| Oil | 20 | 20 | 20 |
| Zinc flower | 3 | 3 | 3 |
| Age resistor | 2 | 2 | 2 |
| Stearic acid | 2 | 2 | 2 |
| Wax | 2 | 2 | 2 |
| Silane coupling agent | 6 | 6 | 6 |
| Sucrose benzoate | | 10 | |
| Sucrose acetate | | | 10 |
| Sulfur | 2 | 2 | 2 |
| Vulcanization accelerator | 2 | 2 | 2 |
| Evaluation (index) | | | |
| Rolling resistance | 100 | 92 | 9 |
| Hardness | 100 | 108 | 107 |

While certain embodiments have been described, these embodiments have been, presented by way of example only, and are not intended to limit the scope of the inventions. Indeed, the novel embodiments described herein may be embodied in a variety of other forms; furthermore, various omissions, substitutions and changes in the form of the embodiments described herein, may be made without departing from the spirit of the inventions. The accompanying claims and their equivalents are intended to cover such forms or modifications as would fall within the scope and spirit of the inventions.

What is claimed is:

1. A rubber composition for a tire comprising a diene rubber, at least one reinforcing filler selected from the group consisting of silica and carbon black, and sucrose acetate, wherein the amount of the sucrose acetate is from 1 to 25 parts by mass per 100 parts by mass of the diene rubber.

2. The rubber composition for a tire according to claim 1, wherein the diene rubber comprises at least one selected from the group consisting of natural rubber, butadiene rubber and styrene-butadiene rubber.

3. The rubber composition for a tire according to claim 1, wherein 100 parts by mass of the diene rubber comprises from 50 to 90 parts by mass of styrene-butadiene rubber and from 10 to 50 parts by mass of butadiene rubber and/or natural rubber.

4. The rubber composition for a tire according to claim 1, wherein 100 parts by mass of the diene rubber comprises from 50 to 90 parts by mass of natural rubber and from 10 to 50 parts by mass of butadiene rubber.

5. The rubber composition for a tire according to claim 1, wherein the diene rubber comprises a modified diene rubber having introduced therein at least one functional group selected from the group consisting of a hydroxyl group, an amino group, a carboxyl group, an alkoxyl group, an alkoxysilyl group and an epoxy group.

6. The rubber composition for a tire according to claim 1, wherein the amount of the reinforcing filler is from 10 to 150 parts by mass per 100 parts by mass of the diene rubber.

7. The rubber composition for a tire according to claim 1, wherein the sucrose acetate has an average esterification degree of from 5 to 8.

8. A pneumatic tire having a rubber part comprising the rubber composition according to claim 1.

9. The pneumatic tire according to claim 8, wherein the rubber part is a tread rubber.

* * * * *